United States Patent [19]

Colombo et al.

[11] 4,097,010
[45] Jun. 27, 1978

[54] SATELLITE CONNECTED BY MEANS OF A LONG TETHER TO A POWERED SPACECRAFT

[75] Inventors: Giuseppe Colombo, Padova, Italy; Mario D. Grossi, Cambridge, Mass.

[73] Assignee: Smithsonian Institution, Washington, D.C.

[21] Appl. No.: 620,679

[22] Filed: Oct. 8, 1975

[51] Int. Cl.² .............................................. B64G 1/20
[52] U.S. Cl. ..................................... 244/158; 244/167
[58] Field of Search ................... 244/1 TD, 159, 161, 244/163, 167, 2, 158

[56] References Cited

U.S. PATENT DOCUMENTS

| | | | |
|---|---|---|---|
| 2,432,371 | 12/1947 | Berberich | 244/1 TD |
| 3,241,142 | 3/1966 | Raabe | 244/167 |
| 3,268,091 | 8/1966 | Melton | 244/161 |
| 3,389,877 | 6/1968 | Huber et al. | 244/161 |
| 3,421,714 | 1/1969 | Koerner | 244/163 |
| 3,478,986 | 11/1969 | Fogarty | 244/159 |
| 3,532,298 | 10/1970 | Swet | 244/167 |
| 3,582,016 | 6/1971 | Sherman | 244/167 |
| 3,765,354 | 10/1973 | Gronroos | 244/163 |

OTHER PUBLICATIONS

"Space Shuttle", pamphlet from the Space Division of Rockwell International, received Feb. 1, 1974.
"Shuttle-Borne 'Skyhook'; A New Tool for Low-Orbital-Altitude Research", (G. Colombo, E. M. Gaposchkin, M. O. Grossi, and G. C. Weiffenbach, Smithsonian Astrophys. Obs. Reports in Geoastronomy, No. 1, 64 pp., Sep. 1974.

*Primary Examiner*—Galen L. Barefoot
*Attorney, Agent, or Firm*—Sughrue, Rothwell, Mion, Zinn and Macpeak

[57] ABSTRACT

There is disclosed a system by which a satellite is connected by means of a long tether, typically a wire 100 km or more in length, to a powered spacecraft. The spacecraft may be the Space Shuttle, and two basic equilibrium positions of the system are discussed. The wire is gradually released from a storage drum aboard the powered spacecraft, and the gravity gradient established along with atmospheric drag provide the force for deployment. The system can be used repeatedly by reeling back onto the drum. The wire, once deployed, can be then left in orbit for use in future shuttle missions and (once reeled back) can be returned to earth for repair or replacement. The tethered system finds utilization in the broad areas of upper atmosphere measurements, gravity gradient measurements and radio physics research.

18 Claims, 6 Drawing Figures

EQUATORIAL ORBIT ———
POLAR ORBIT – – – –

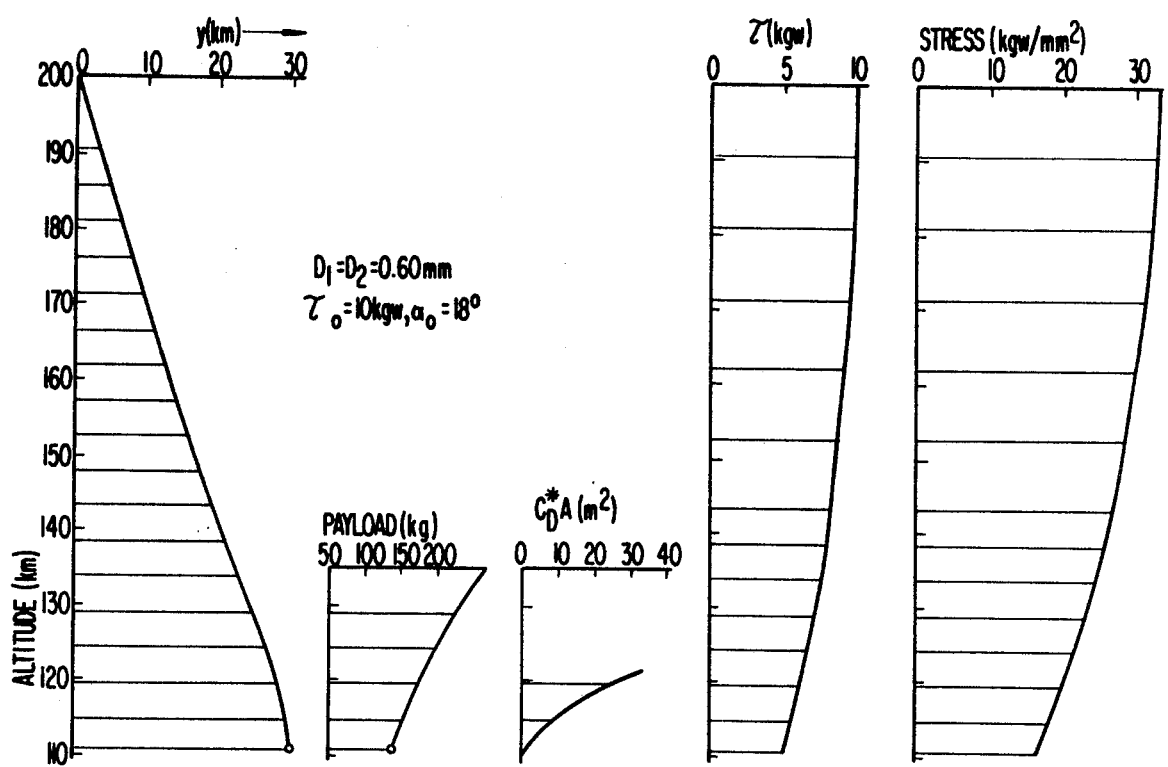
FIG.3
FIG.4
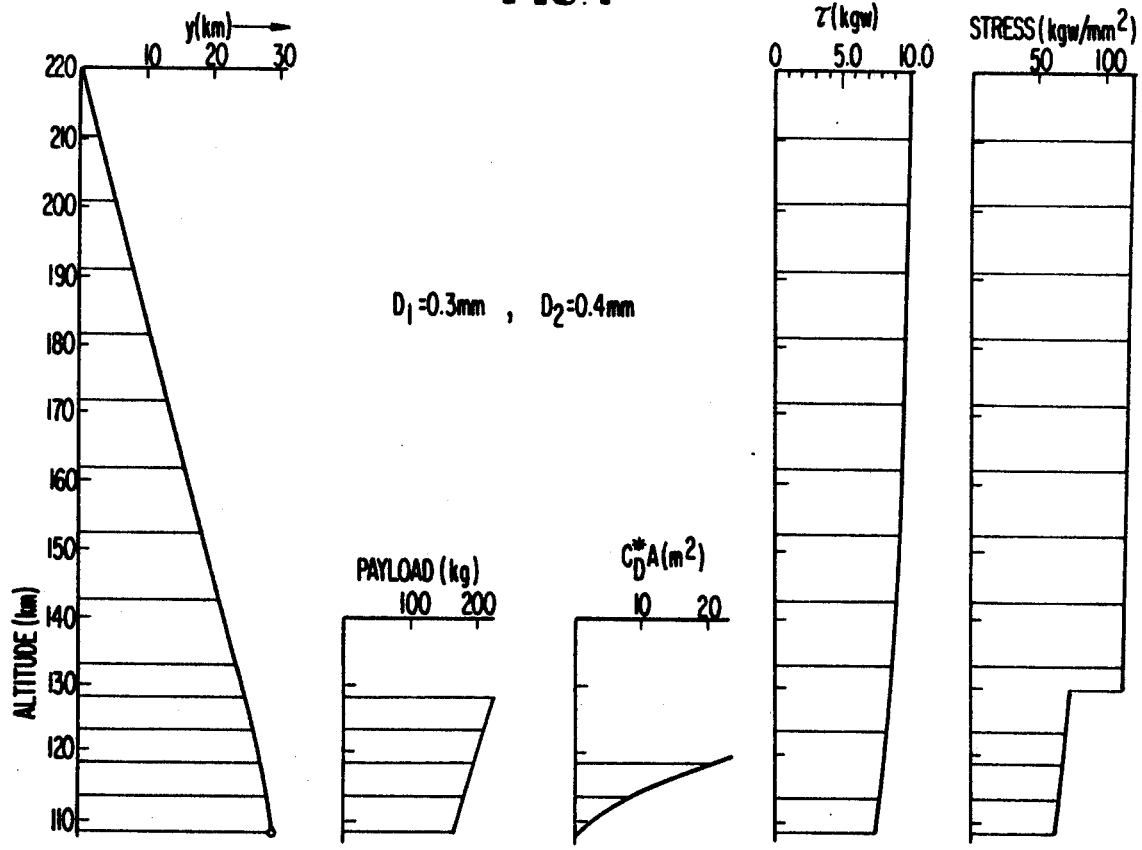

SATELLITE CONNECTED BY MEANS OF A LONG TETHER TO A POWERED SPACECRAFT

BACKGROUND OF THE INVENTION

1. Field of the Invention

This invention is related to the field of space technology and, in particular, to a spacecraft configuration.

2. Prior Art

The use of spacecraft to perform a variety of different functions for the benefit of mankind has reached the point of practical application. While early spacecraft designs were configured to demonstrate proof of concepts, such as stabilization techniques, limited applications or component testing in the intended operational environment, the contemporary utilization of spacecraft is directed toward more operational modes. Typical dividing points are space applications such as communications, weather mapping, earth resources and secondly science, which seeks to achieve a better understanding of our earth and the active forces contributing to life sciences.

For applications, spacecraft have heretofore been designed and engineered to reflect both the parameters of the mission, and the orbit to efficiently accomplish that mission. A first example is communications where the desirability of placement of the spacecraft in a synchronous orbit for efficient transmission has long been recognized. Before such orbits were achievable, low orbits were used, requiring active tracing by ground stations. First satellites were merely reflectors, such as the balloon Echo. However, where boosters became available, in view of the limited power available, only smaller spacecraft were initially used. These two requirements led to the development of spin-stabilized spacecraft such as SYNCOM, ATS I & III, and the Intelsat III, IV series. As launch capabilities increased, making wide band communication more attractive with different spacecraft, a new generation of spacecraft such as the ATS-VI evolved which were three axis stabilized. The use of three axis stabilization techniques facilitated the deployment of large antenna arrays not possible with spin-stabilized bodies.

Communications satellites represent the evolution of a particular type of spacecraft within a mission model requiring synchronous orbits. In another application, earth resources the mission model is coupled to sensor resolution and repeatability of orbits. Rather than orbit at 22,400 n-miles (synchronous), these spacecraft, ERTS, LANDSAT, are placed in polar orbits such that the sensors provide adequate resolution while maintaining a constant sun angle over the viewing area for a plurality of reoccurring orbits. The spacecraft are generally stabilized platforms requiring active ground tracking stations for the acquisition and transmission of data.

Scientific spacecraft have also followed the same trends in terms of configurations being determined by payloads. Spacecraft designed for studies in low frequency transmissions, interferometric measurements and gravity-gradient work generally require long arms or booms, thereby precluding the use of spin stabilization techniques. The spacecraft, accordingly, have been either three-axis stabilized or gravity-gradient stabilized. Other areas of study using satellites, geophysics and aeronomy seek to sample the upper atmosphere (110 km or less) or conduct high resolution earth observations from near earth positions. Early attempts focused around the use of sounding rockets, which, following launch, traced a ballistic trajectory into the region for brief periods of observation or sampling. While sounding rockets are relatively inexpensive, the results are less satisfactory in terms of both sampling interval and return. Another attempt to experiment into this region is typified by the Atmosphere Explorer (AE) which is launched into an eccentric orbit with a low perigee. Each passage of the spacecraft at the perigee provides an opportunity for in situ sampling at the desired low altitude, with complete low-altitude observations over the entire orbit than obtained through perigee and modal precession. However, such sampling is discontinuous and not entirely satisfactory.

With the advent of the Space Shuttle, a new dimension is available in spacecraft design, performance and utilization. The Shuttle, with multiple flight capability offers, for the first time, recovery of experiments for repair and further use. Of equal importance is the ability to readily change orbits and actively use on board thrusters to maintain marginal orbits that would otherwise decay. The Space Shuttle and subsequent spacecraft of its type offer the scientist new opportunities to explore the upper atmosphere on a continuous basis. The current public interest in environmental matters such as the depletion of the ozone layer, as well as continuing scientific interest for geophysics and aeronomy make it incumbent that systems making such research possible be brought to the point of practical application.

SUMMARY OF THE INVENTION

Accordingly, it is an object of this invention to provide a system for the continuous sampling of the upper atmosphere from space;

It is another object of this invention to provide a system wherein a satellite is connected to a powered spacecraft;

It is a further object of this invention to provide a system wherein a satellite is connected to a powered spacecraft by a long tether whose configuration is governed by the gradient of the earth's gravitational field and (when present) by the atmospheric drag;

Yet another object of this invention is to provide a system in which a powered spacecraft uses its thrusters to compensate for losses due to atmospheric drag in order to prevent degradation of satellite altitudes;

A further object of this invention is to provide means of retrieving by the Shuttle a tethered satellite, with consequent substantial cost savings with respect to the proposed use of Shuttle-borne so-called Throw-Away-Packages (TAP);

It is another object of this invention to provide a housing, at a distance from the Shuttle, for experiments that use sensitive instrumentation that is incompatible with the high electromagnetic interference levels expected to exist on the Shuttle;

Still another object of this invention is to provide a deployment and recovery system for a satellite to be coupled to a powered spacecraft by means of a long tether;

Yet another object of this invention is to provide a communications system and a thermal compensation for a satellite to be deployed and maintained within a region of aerodynamic heating in the earth's upper atmosphere.

These and other objects of the invention are fulfilled by a system wherein a powered spacecraft maintains a tethered spacecraft in orbit for experimentation at very low orbital altitudes. Deployment and unreeling is accomplished by relying on the gravity-gradient and (when present) on the atmospheric drag. In the latter case, an aerodynamic brake, such as a large balloon can be attached to the satellite. In a deployed configuration, various applications of the satellite can be undertaken. Both the satellite and the tether can be used in the performance of various experiments such as: (1) upper atmospheric measurements at the lowest possible subsatellite height (100km and possibly lower); (2) geomagnetic measurements with the subsatellite in the same height range; (3) gravity-gradient measurements with the subsatellite in the same height range; and (4) radiophysics measurements in the lower magnetosphere. In the latter case, the long tether wire represents a unique tool for in situ research. Radiation studies from a long antenna at frequencies down to a few Hertz or below, guided magnetospheric-propagation investigations and plotting of near-field and far-field patterns of a long antenna in a magnetoplasma are among the activities that can be performed. The electrodynamic interaction of the wire with the magneto-ionic medium and the wire's behavior as an "Alfvem Engine" could also be investigated.

Overall orbital maintenance is provided by the spacecraft thrusters. The thrusters will be kept ignited while the satellite is at its lowest altitude to prevent decay of the spacecraft's orbit. In alternative, they can be periodically pulsed in order for the spacecraft to reacquire the wanted orbital height. To achieve greater fuel economy, the satellite may be reeled back to a greater altitude when the low level experimentation is concluded.

Other characteristics and advantages of the invention will become apparent from the following description, only by way of example having no limiting character, with reference to the accompanying drawings and diagrams.

BRIEF DESCRIPTION OF THE DRAWINGS

FIG. 3 is a graph showing a fourth example of equilibrium configurations on the tether;

FIG. 4 is a graph showing a fifth example of the equilibrium configurations on the tether;

DESCRIPTION OF THE PREFERRED EMBODIMENT

With this invention, two equilibrium positions are possible, one with the satellite orbiting at an altitude higher than the spacecraft, and the other with the satellite (now a subsatellite) orbiting lower. For useful applications, the second system configuration is more relevant than the first. In particular, it makes possible the performance of long-duration, continual sampling of the upper atmosphere at heights only sporadically and unevenly probed thus far. The description presented here is mainly concerned with this second configuration, shown in FIG. 1, although it can be easily adapted to the first. In the height range considered (in the vicinity of 100 km), a conventional, untethered satellite has a lifetime of a few hours, while the system herein has a lifetime identical to that of the powered spacecraft (in practice, weeks or even months) since the powered spacecraft, such as the Space Shuttle, will be in orbit to perform many experiments for lengths of time of this magnitude. This invention does not require that the spacecraft carry the long-tether system as the sole payload, but rather as only one of the many experiments accommodated onboard each flight.

Figure 1:
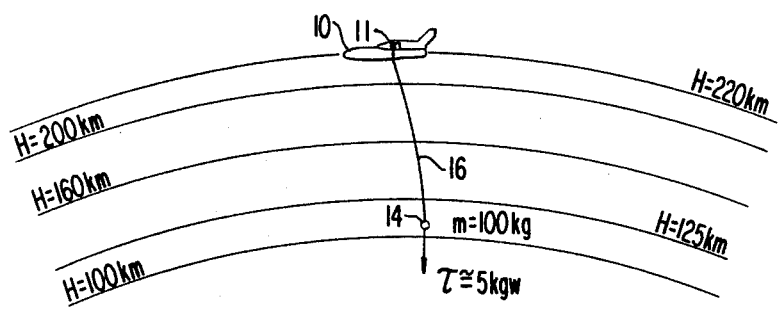
FIG. 1 is a schematic diagram of a typical configuration of the tethered satellite (subsatellite case)

As shown in FIG. 1, the spacecraft is located in an orbit, typically about 220 km above the earth, shown schematically at 12. The satellite 14 is disposed by means of a tether 16 to an altitude of approximately 110 km. The wire 16 is initially reeled on a drum or other deployment means 11 in the spacecraft 10, and two mechanisms — the gravity-gradient and atmospheric drag (when present) — provide the forces for unreeling the tether and deploying the system. Either a passive or an active brake dissipates the correct amount of energy during system deployment. To operate the system, only the initial push needs to be provided, and the desired length of wire is unreeled gradually. The system can be used over and over again for a number of orbital flights, until mechanical failure forces repair or replacement of the spacecraft. Once reeled back on its drum, the tether and its payload can be brought back to earth at the end of a certain shuttle orbital flight and utilized again in a later one. In the alternative, the long wire (with appropriate terminating masses) can be left deployed in orbit and further used either from the ground or on the occasion of later shuttle flights.

Although the lowest attainable heights are the most relevant, as discussed earlier, it is emphasized that the tethered satellite (with, for example, a 100 km tether as shown in FIG. 1) can actually acquire virtually any height from 100 km or more below the powered spacecraft 10 and up to 100 km or more above it.

Preliminary characteristics, as shown in Table 1, of a system that can tether a 100 kg subsatellite below the spacecraft at any altitude down to 110 km are now presented in this preferred embodiment.

TABLE 1

| Altitude range (km) | Maximum temperature (K°) | (C°) | (F°) | Wire tension (kgw) | Diameter (mm) (safety factor=2) | Wire Type |
|---|---|---|---|---|---|---|
| 110–120 | 980 | 710 | 1310 | 3.2 | 0.366 | A-286 |
| 120–130 | 780 | 510 | 950 | 4.2 | 0.362 | A-286 |
| 130–140 | 660 | 390 | 734 | 5 | 0.212 | stainless steel type 302 |
| 140–150 | 580 | 310 | 590 | 6 | 0.234 | stainless steel type 302 |
| 150–160 | 550 | 280 | 536 | 7 | 0.252 | stainless steel type 302 |
| 160–170 | 530 | 260 | 500 | 8 | 0.270 | stainless steel type 302 |
| 170–180 | 510 | 240 | 464 | 8.8 | 0.282 | stainless steel type 302 |
| 180–190 | 500 | 230 | 446 | 9.2 | 0.288 | stainless steel type 302 |
| 190–200 | 480 | 210 | 410 | 9.8 | 0.298 | stainless steel type 302 |
| 200–210 | 460 | 190 | 374 | 10 | 0.300 | stainless steel type 302 |

As shown in the above table, the critical element is the wire. For demonstration purposes, two types of wire that are commercially available as standard products, (1) type 302 stainless steel rope wire commonly used in wire cable and made in the diameter needed here and in great lengths, and (2) a high-strength, high-temperature wire alloy A-286 made by the Carpenter Steel Co. (Fe plus 26% Ni, 15% Cr, 2% Ti, 1.5% Mn, 1.5% Mo, and 0.3% V) are evaluated. Type 302 rope wire, with a yield strength of 210 kgw/mm$^2$ up to a temperature of 430° C, is used for the upper part of the tether. The lower end is heated by atmospheric drag to higher temperatures, necessitating the use of the high-temperature wire, which has a yield strength of 60 kgw/mm$^2$ for temperatures up to 710° C. The wire size selected has a safety factor of 2 for this example.

With the powered spacecraft 10 at a height of 220 km, a 110 km, two-section wire tether will maintain the satellite 14 at a height of about 110 km. The characteristics of such a two-section wire are shown below in Table 2, in which the total mass of the 110-km tether is 66.8 kg.

TABLE 2

| Characteristic | Section 1 | Section 2 |
| --- | --- | --- |
| Wire type | 302 | A-286 |
| Wire diameter | 0.30 mm | 0.366 mm |
| Length | 90 km | 20 km |
| Volume | 6.3 × 10$^3$cm$^3$ | 2.1 × 10$^3$cm$^3$ |
| Mass | 50.2 kg | 16.6 kg |

For a reel 36 cm long, it will be sufficient for housing the tether to have an outside diameter of 36 cm. The cave cylinder around which the wire is actually wound has a 20-cm diameter. For purposes of deployment, a 1-hp electric motor, with a gearing ratio of approximately 10:1, will rotate the reel at 238.7 rpm, corresponding to a maximum wire speed of 2.5 m/sec (approximately 13 hours will be needed to reel the 110-km wire). Depending on the deployment procedure adopted, it may be convenient, when the spacecraft is in a circular orbit at 200 km and above, to have a higher unreeling velocity in the system in order to achieve an altitude corresponding to a sufficiently high atmospheric density at the first perigee passage. The mass breakdown of the long-tether system of this first example is shown below in Table 3.

TABLE 3

| Reel | 8.3 kg |
| --- | --- |
| 1-hp electric motor | 5.0 |
| Gear, electronics, etc. | 11.7 |
| Shock absorbers | 5.0 |
| Wire weight (conservative estimate) | 90.0 |
| | 120.0 kg |

While the satellite 14 is being deployed at its lowest possible height, the spacecraft 10 will maneuver in such a way as to acquire the minimum feasible orbital height. The tether 16 will be unreeled for 100m or so, and an aerodynamic brake B will be achieved. A balloon brake may alternatively be used, and at this the balloon will inflate. Atmospheric drag and the differential gravity force will provide the necessary pull for further unreeling of the wire. The spacecraft will then increase its height to the designated orbital value (for instance, 200 km), while the tether unreels completely and the satellite 14 will descend to a height of 100 km as desired.

In deploying the tethered subsatellite, the spacecraft 10 is, in this example, in orbit with a 180-km perigee and a 200 km apogee. The area-to-mass ratio for the wire is initially very large. When the system is deployed slowly, the releasing drag force will also be large. With a 2.5-m/sec release velocity of the wire, it will take approximately 13 hours to deploy the system, but at any stage of the deployment the system can be kept in an equilibrium configuration.

A principal concern is the time involved in the operation of the system and the energy requirements. If the powered spacecraft is in a 200-km-altitude circular orbit, the time of deployment can be shortened by imposing an initial relative velocity opposite to the direction of the spacecraft's motion. This will lower the initial subsatellite perigee. A preferred procedure is then to begin the deployment during the spacecraft's ascent to orbit. The operation can begin at an altitude of 150 km and the satellite will remain there until deployment of the whole system is initiated. In this case, there is no need of the balloon, because the area-to-mass ratio of the wire-subsatellite system will be sufficient. On the other hand, the 5-km wire with attached satellite will not require a significant expenditure of energy and will help stabilize the spacecraft orientation. However, a balloon with an elastic wall and a variable inside pressure adds another control parameter that is useful in optimizing the deployment procedure and, especially, in minimizing deployment and stabilization times. Control signals can be sent from the spacecraft to the balloon (connected to the tethered satellite) in order to adjust the inside pressure by operating suitable valves.

Another deployment alternative is to fly the spacecraft in an eccentric orbit with a perigee of 180 km or lower. The release will then begin when the spacecraft is at perigee; the relative velocity of the subsatellite will be a few (possibly 10 to 20) meters per second in the direction opposite that of the spacecraft. The system will increase its angular velocity with a decrease in semimajor axis, as actually happens with any ejected satellite. The force exerted by the spacecraft will maintain the system in an almost vertical configuration. When the operation is initiated, the tension in the wire will be sufficient to speed up the process of deployment.

During operation, the energy necessary to overcome atmospheric drag (contributed by the cross sections of the wire and of the satellite) comes from the spacecraft thruster. The thruster will be kept ignited (with an output thrust of a few kgw) while the satellite height is maintained at 100 km. If this is not done, the overall system configuration will not be stable and the spacecraft's orbit will continually decrease to lower and lower heights.

A small fraction of the fuel carried into orbit by the spacecraft will be spent to provide the thrust that prevents this occurrence. Possible restrictions in the amount of fuel the spacecraft will be allowed to spend for drag compensation can be accommodated first by keeping the subsatellite at 100 km only for the amount of time necessary to perform the scheduled measurements and then by increasing the satellite's height (by reeling back the tether) to 120 to 130 km for the remainder of the flight.

The energy requirements for this operation are compatible with the spacecraft's capability. A rough evaluation of these requirements indicates that in order to provide a typical force of 15 kgw aligned along the local vertical of the spacecraft (which has a mass of 100 tons), the spacecraft's velocity must be increased to 0.858 m/sec in order to hold the wire. This velocity increment is large enough to maintain the orbital altitude of the spacecraft. The variation of the velocity is insignificant with respect to the absolute velocity, and therefore the equilibrium configuration, which has been computed by neglecting this variation, does not differ significantly from the real one. In addition to the force directed along the vertical, a continuous thrust ($F_v$) tangential to the spacecraft orbit in order to balance the total drag on the system is necessary. The magnitude of the thrust ranges from 1.5 to 4 kgw.

The fuel requirement per day of operation using this system can be evaluated by assuming that the propulsion system of the spacecraft has a specific impulse $I_{sp} = 400$ sec. Since, $$F_v = I_{sp} g(\Delta m / \Delta t)$$

where $\Delta m / \Delta t$ is the mass released by the powered spacecraft per unit of time, and $g$ is the acceleration of gravity, therefore, $$\Delta m = (F_v / gI_{sp})\Delta t.$$

For $F_v = 1.5$ kgw, the result is, $$\Delta m = 3.75 \times 10^{-3} \Delta t.$$

where $\Delta m$ is in kilograms and $\Delta t$ in seconds. This implies a consumption of total fuel mass per day of the order of 322 kg. For 3 kgw of thrust, twice as much is needed. By raising the altitude of the satellite 10 km (that is, to between 110 and 120 km), a 1-order-of-magnitude decrease in fuel consumption is achieved. However, even if a minimum height of 100 km is reached, the system is functional from the point of view of energy requirements during operation.

A rough evaluation of an upper bound for the energy dissipated during deployment can be obtained by simulating a case in which the total system, initially in orbit at 200 km, is brought down to 100 km. The difference in energy is less than $5 \times 10^7$ kgw $\times$ m. Since the orbital revolution is $4 \times 10^6$ m long, the energy required is less than one-half that needed to keep the system in orbit for one day.

The braking action of the wire and of the subsatellite on the space-craft can also be exploited for decreasing the total energy consumption required for the experiment. With the spacecraft at 220 km and the satellite at 110 km, the spacecraft will experience a decelerating force of the order of 1 kgw. If no thrust is applied to the spacecraft, the latter will begin to deorbit. If the wire is slowly reeled back and the satellite is maintained at the constant height of 110 km, the decelerating force acting on the spacecraft will not change appreciably and the spacecraft will continue to deorbit to lower altitudes. A preliminary evaluation has shown that the spacecraft will reach a height of 160 km in five to ten days. With this scheme, the energy requirements are drastically reduced, but the overall mission time will have to be large compared to that necessary for deorbiting.

Still another procedure comprises deploying the system only a few days before the scheduled reentry of the spacecraft. By optimizing the deployment and the recovery scheme, the energy requirement can be further minimized.

Additional examples are shown in Table 4. These examples consider larger masses for the satellite payload, and, consequently, a heavier tether must be utilized. However, in none of the examples does the overall mass of the tether and associated electromechanical gear exceed 250 kg. The symbols used in Table 4 are as follows:

$\tau_0$ the wire tension (kgw) at the spacecraft end,
$\alpha_0$ the deviation (degrees) from the vertical of the wire at the spacecraft end,
$H_{min}$ the minimum height (km) of the satellite,
L the maximum length of wire (km),
$l_s$ the length of the lower portion of the wire (km),
P the subsatellite mass (kg),
$C_d^* A$ the product of the drag coefficient and the cross section of the subsatellite (m²),
$Y_{max}$ the maximum horizontal deviation (km) of the wire with respect to the spacecraft,
$\tau_y(0)$ the horizontal component of the force applied to the wire at the spacecraft end (kgw),
$v(L)$ the maximum stress (kgw/mm²) at the subsatellite.

TABLE 4

| $\tau_0$ (kgw) | $\alpha_0$ (deg) | $H_{min}$ (km) | L (km) | $l_s$ (km) | P (kg) | $C_d^* A$ (m²) | $Y_{max}$ (km) | $\tau_y(0)$ (kgw) | $\frac{v(L)}{\text{kgw}}$ mm² | Figure |
|---|---|---|---|---|---|---|---|---|---|---|
| 10 | 5 | 122 | 78 | 8 | 245 | 1.34 | 6.0 | 0.87 | 26 | 2 |
| 10 | 10 | 115 | 86 | 15 | 204 | 0.52 | 13.9 | 1.74 | 24 | 2 |
| 10 | 15 | 112 | 91 | 18 | 182 | 0.69 | 22.6 | 2.59 | 22 | 2 |
| 10 | 18 | 111 | 94 | 19 | 139 | 0.77 | 29.7 | 3.09 | 17 | 3 |
| 10 | 15 | 109 | 115 | 21 | 168 | 0.80 | 28.8 | 2.59 | 63 | 4 |

Figure 2:
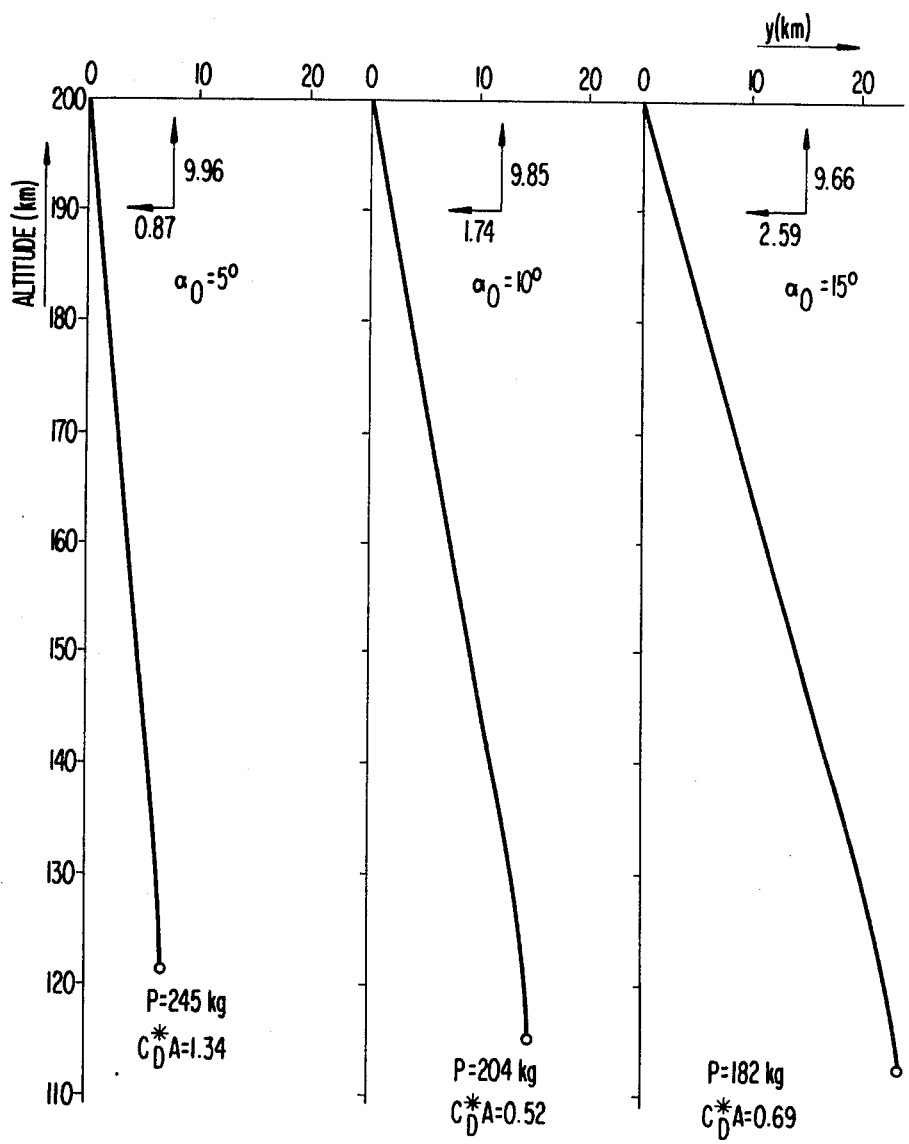
FIG. 2 is a graph showing three different equilibrium configurations on the tether.

FIGS. 2, 3 and 4 plot some of the data presented in Table 4. The third case in FIG. 2 is for a payload of 182 kg and a cross section of 0.7m²; the payload's orbit is maintained at 112-km altitude with a 91-km wire, the lower portion of the wire being 18 km long. The part of the wire made of type 302 stainless steel is 0.45 mm. in diameter, and that of the A-286 alloy 0.6 mm. The force to be applied at the spacecraft end of the wire is 2.6 kgw, which corresponds to a total force of 10 kgw inclined by $a = 15°$ with respect to the local vertical. The stresses along the wire are compatible with the elastic properties of the material used for the wire itself.

Figure 5:
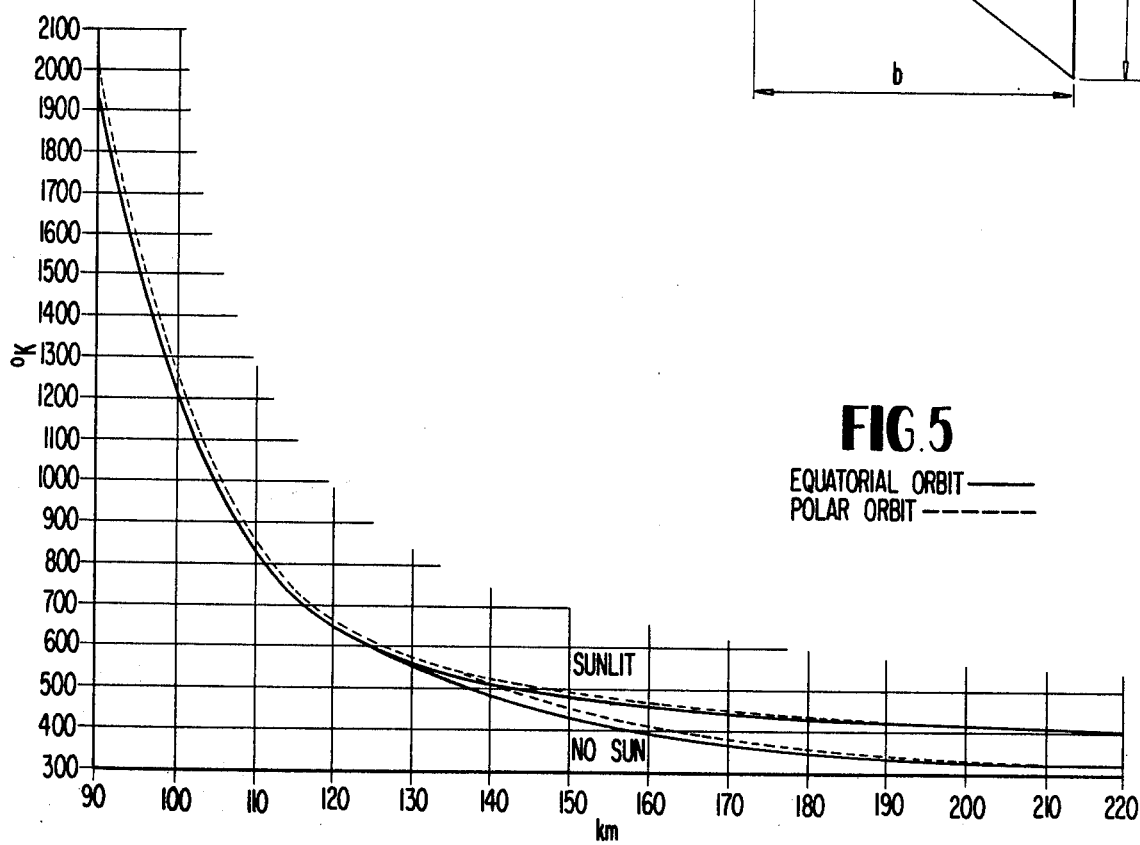
FIG. 5 is a plot of wire temperature versus altitude for both equatorial and polar orbits.

The thermal aspects involved in this system will next be considered. This is a most critical point, especially when a low height (e.g., in the vicinity of 100 km) is specified for the satellite. The atmospheric drag substantially heats both the wire and the satellite. FIG. 5 shows thermal profiles for the wire, computed with a thermal-absorption coefficient of 0.032 for the wire and with a spacecraft height of 220 km. The two-section wire materials used in Table 1 and Table 2 have also been adopted for the examples given in Table 4. The wire will preserve its mechanical properties even at these relatively high temperatures. Although type 302 stainless steel and A-286 alloy have been employed as possibilities for the wire materials, other metal or nonmetal wires may also be suitable.

The temperature of the satellite itself also reaches levels high enough that a heat shield is required. Table 5 gives the surface (heat-shield) temperature expected for two specific sizes of a 100-kg satellite.

Figure 6:
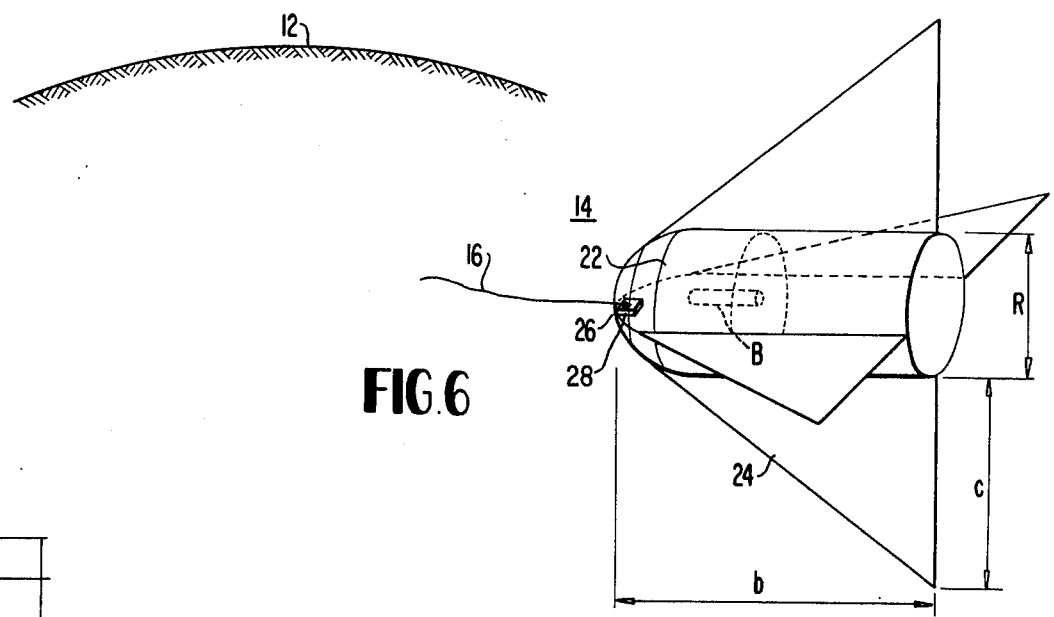
FIG. 6 is a schematic diagram of one configuration of the tethered satellite.

Referring now to FIG. 6, one configuration for the tethered satellite is shown. The satellite is essentially a cylinder 22 of diameter R with an overall length b. Projecting from the cylinder 22 are a series of fins 24 which serve to provide surface area for heat dissipation. The foward end 26 may be of a blunt body configuration with heat shielding to minimize aerodynamic heating.

The wire is connected to the subsatellite in such a way that its alignment contains the center of mass of the satellite itself. Also, the connection of the wire to the satellite is mechanized with an elastic joint, or shock absorber 28 capable of absorbing impulsive loads.

In Table 5, it is assumed that both the emission and the absorption coefficient of the heat shield are unity, and that a heat-pipe system conducts heat to the radiation surfaces. From Table 5, for heights equal to or greater than 110 km, the thermal problem is solvable within the present state of the art in heat-shield design. Other possible thermal designs exist that would allow a further reduction of the temperatures cited.

TABLE 5

| Height (km) | Case 1* | | Case 2+ | |
|---|---|---|---|---|
| | $T^4 = T_0^4 + 385.9$ (°K) | $p(x)v^3$ (°C) | $T^4 = T_0^4 + 234.1$ (°K) | $p(x)v^3$ (°C) |
| 90 | 868 | 595 | 767 | 495 |
| 100 | 559 | 286 | 500 | 227 |
| 110 | 394 | 121 | 366 | 93 |
| 120 | 331 | 58 | 320 | 47 |

*R = 20 cm, b = 80 cm, c = 50 cm.
+R = 20 cm, b = 100 cm, c = 80 cm.

Two configurations of the satellite are explored in Table 5; in both cases, the diameter is 20 cm. However, in the second case, the basic body is longer. As shown in Table 5, the greater fin surface for heat dissipation results in low external temperatures for the satellite.

In view of the possibility that the system resonates (or subresonates) under the excitation of periodic external forces, the first two natural modes (pendular motion of the satellite and the wire around the equilibrium configuration) can be analyzed. These periodic forces are due either to gravitational forces (for instance, to a small eccentricity in the orbit) or to periodic terms in the drag force caused by diurnal, semidiurnal, or short-wavelength fluctuations in the atmospheric density. The analysis can be done by considering the wire and the satellite to be in equilibrium along the vertical passing through the spacecraft. Oscillation periods of 51, 16 and 10 minutes are obtained. These resonances do not coincide with the frequency of the predominant periodic external forces, and, therefore, there is minimal danger of the oscillations being excited to such an amplitude that they become destructive to the wire.

Various applications for this novel system may require a two-way communications channel between the spacecraft and the satellite, which can be established with existing radio-link technology. A microwave link between the two terminals (path losses are approximately 140 dB at S-band between two isotropic terminals, 100 km apart, in free space) will use a low-gain antenna on the satellite and a moderately high-gain antenna on the spacecraft, the latter being equipped with tracking capabilities. Bandwidths as large as 1 MHz require levels of transmitter power of a few watts.

Also, the tether may function, when properly coated with a dielectric, as a multi-repeater Harms-Goubau transmission line, based on the principle of single-conductor surface-wave transmission. A radially symmetric, transverse-magnetic mode (the $TM_{00}$ mode) at VHF/UHF propagates along the coated wire and is launched in it (recovered from it) with a coaxial horn or annular slot launcher (coupler) at each end of the tether. Scientific data collected with the instrumentation on board the tethered satellite, as well as housekeeping information pertaining to the physical conditions and to the performance of the satellite itself, can be transferred with this communications channel to the spacecraft. Conversely, signals for commanding satellite-borne instrumentation and for commanding the inflatable/deflatable balloon connected with the satellite (to help deployment) can be transmitted from the spacecraft via the same channel.

Among the practical uses of the tethered satellite system, three categories appear of particular interest: (1) upper atmospheric measurements at the lowest possible subsatellite height (100 km and possibly lower); (2) geomagnetic measurements with the subsatellite in the same height range; (3) gravity-gradient measurements with the subsatellite in the same height range; and (4) radiophysics measurements in the lower magnetosphere. Much less is known about the atmosphere between 100 and 150 km than in other height bands, but that is the region, however, where most of the solar absorption takes place and where basic conversion processes occur. Therefore, measurements at this height are of uppermost relevance. Existing instrumentation can be installed in the satellite for this purpose. Retroreflectors, added to the satellite's external surface, can perform laser backscatter measurements, which are important to atmospheric science, from the powered spacecraft or from the earth's surface.

Similarly, gravity-gradient measurements at 100 km are of great interest and are at present lacking. Such measurements are vital to the aim of improving the accuracy and reliability of gravity-field models. Furthermore, by reaching a minimum height as low as 100 km, existing gravity gradiometers are sensitive enough (they provide a resolution of 0.25 eu in 20-sec integration time) to measure low-amplitude, high-order harmonics (possibly beyond the 150th) of the earth's gravity field. However, at higher orbital altitudes (where conventional satellites have a sufficiently long life), existing gravity-gradient instrumentation is not sensitive enough for this purpose.

Among the conceivable magnetospheric experiments made possible by a tethered satellite and by the large wire itself is the generation of artificial micropulsations. This experiment would make possible the separate identification of generation and porpagation effects in the phenomenology of natural micropulsation — an issue that cannot be resolved by performing solely passive observations of natural events. The propagation properties of micropulsations could be established by performing observations at the earth's surface (in magnetically conjugate regions and in other points of interest) and from a satellite (tethered or free-flying) orbiting in the magnetosphere. Other related issues that could be investigated include the ionospheric shielding effect at ULF, the excitation from the $F_2$ layer and higher of ULF-guided waves in the earth-ionosphere cavity, and wave-particle interaction phenomena in the magnetosphere.

While these goals could be the ultimate aim of radiophysics experiments, an immediate objective could be the study of the properties of the long wire itself used as an antenna embedded in an unbounded magnetoplasma, excited by a Shuttle-borne ULF transmitter. Even without this excitation, the electrodynamics of a conducting wire that moves in the earth's magnetic field is per se a very interesting topic of research. Such an experiment may shed light on large-scale magnetospheric phenomena of the type encountered in the Io-Jupiter electrodynamics interaction.

It is obvious that it is not possible to set out all the variations and modifications that can be employed by the basic scheme described here. The invention is not limited to the embodiments discussed here, nor are the uses described the only ones in which the system can be effectively employed.

What is claimed is:

1. A system for conducting space experiments comprising a powered spacecraft, said spacecraft having thruster means capable of maintaining said spacecraft in a desired orbit, a satellite disposed in a suborbital mode and a flexible tether coupling said spacecraft and said satellite.

2. The system of claim 1 wherein the powered spacecraft carries the satellite into orbit by said thruster means and including deployment means on said spacecraft to release said tether.

3. The system of claim 1 wherein said tether is in the order of 100 km in length.

4. The system of claim 2 wherein deployment of the satellite takes place by means of an aerodynamic brake disposed on said satellite.

5. The system of claim 2 wherein a gravity-gradient is initiated between said spacecraft and said satellite to initiate deployment of said satellite.

6. The system of claim 1 wherein said flexible tether is comprised of two different types of wire to maintain uniform stress and temperature resistance throughout the length of the tether.

7. The system of claim 1 wherein said satellite has heat dissipation means.

8. The system of claim 7 wherein said heat dissipation means comprises a heat shield on the body of said satellite and heat radiating fins attached to said satellite.

9. The system of claim 1 wherein said satellite has shock absorber means disposed therein to reduce impulsive loadings on said tether.

10. The system of claim 1 wherein said tether is coupled to said satellite at the center of mass of said satellite such that orientation of the satellite is achieved by aerodynamic torque.

11. A method of conducting scientific investigations in space comprising the steps of:
    (a) launching a satellite to an orbital altitude by carriage with a powered spacecraft,
    (b) deploying said satellite from said powered spacecraft to a suborbital altitude by release of a tether, and
    (c) maintaining said satellite and spacecraft in a uniform orientation once deployed.

12. The method of claim 11 wherein said powered spacecraft maintains a thrust level to compensate for atmospheric drag generated by said satellite in said suborbital altitude.

13. The method of claim 11 wherein said tether is deployed to a length in the range of 100 km.

14. The method of claim 11 wherein said deployment of said tether takes place at the rate of 2.5 meters per second.

15. The method of claim 11 including the additional steps of deorbiting the powered spacecraft using the atmospheric drag of said satellite to reduce the velocity of said powered spacecraft and retrieving said satellite.

16. The method of claim 11 including the steps of detaching said satellite and deorbiting said spacecraft whereby said satellite remains in orbit.

17. The method of claim 11 wherein the deployment of said satellite takes place while the spacecraft powers to a designated orbit.

18. The method of claim 11 wherein command and control signals are sent to said satellite from the powered spacecraft by means of said tether.

* * * * *